United States Patent [19]

Lowe et al.

[11] Patent Number: 4,669,925
[45] Date of Patent: Jun. 2, 1987

[54] ROUGHING/FINISHING THREADER

[75] Inventors: Tony M. Lowe, Royal Oak; Thomas J. Bernadic, Ferndale, both of Mich.

[73] Assignee: GTE Valeron Corporation, Danvers, Mass.

[21] Appl. No.: 824,597

[22] Filed: Jan. 31, 1986

[51] Int. Cl.⁴ .................. B23G 5/02; B23B 27/16; B23B 27/22

[52] U.S. Cl. .................. 407/114; 10/101 R; 407/113

[58] Field of Search ............ 10/101 R; 407/113, 114, 407/115, 116, 117

[56] References Cited

U.S. PATENT DOCUMENTS

| | | | |
|---|---|---|---|
| 4,281,430 | 8/1981 | Hellnick | 407/113 |
| 4,335,984 | 6/1982 | Zweekly | 407/114 |
| 4,340,325 | 7/1982 | Gowanlock | 407/116 |
| 4,465,412 | 8/1984 | Zweekly | 407/114 |
| 4,575,888 | 3/1986 | Muren | 407/113 |
| 4,583,887 | 4/1986 | Wertheimer | 407/116 |

OTHER PUBLICATIONS

Carbolock Threading Grooving & Cut-Off Products Carboloy Systems Dept GE, Jul. 1981.

Primary Examiner—Nicholas P. Godici
Assistant Examiner—Jerry Kearns
Attorney, Agent, or Firm—Lloyd M. Forster

[57] ABSTRACT

Roughing threader cutting tool for Buttress pipe thread employing three scallops with arcuate chip breaking back walls for leading transvese and side flank cutting edges solving problem of excessive time consuming multiple passes and coil string chips and quadrupling production rate compared to cutting complete thread with finish threader.

14 Claims, 5 Drawing Figures

ROUGHING/FINISHING THREADER

BACKGROUND OF THE INVENTION

Threading tools currently in use for making an industry standard or special threadforms used for both internal and external threads which may vary in diameter, are subject to serious limitations. Typically an indexable throwaway insert cutting tool, having one or more cutting edges, each provided with finished thread form, is required to make multiple passes to complete a single thread requiring extensive time. Secondly, the thread stock is removed in the form of elongated strings which require frequent interruption for removal as well as hazard to the operator from erratic tangling and breakage.

BRIEF SUMMARY OF THE PRESENT INVENTION

In a prior co-pending application Ser. No. 785,211 filed on Oct. 7, 1985, now U.S. Pat. No. 4,626,140, a circular chip control insert is disclosed employing peripheral scallops with arcuate chip breaking back walls intersecting on ridges of diminishing height terminating substantially at the peripheral cutting edge.

Applicants have developed a special rough/finish threader which employs a similar chip breaking scallop principle that may be used to remove all or major portion of the thread stock in fewer passes than previously required with excellent chip control, to produce the form required. Test runs establish a quadrupling of total production rates together with remarkable improvement in chip material handling. The roughing/finishing cutter is provided with a transverse leading thread cutting edge extending substantially parallel to the thread axis and normal to the incremental feed path with a positive rake arcuate chip breaking back wall scallop and side flank cutting edges also with positive rake arcuate chip breaking back wall scallops. The adjacent back walls of the three scallops intersect in two ridges of diminishing height terminating at the cutting edges. The scallop back wall for the 45° thread flank cutting edge has a straight extension to the cutting edge intersecting at a 30° angle.

The scallops employed provide a chip splitting at the intersection ridges and a control of chip flow substantially normal to the thread axis which avoids curling and promotes breakage.

DESCRIPTION OF THE PREFERRED EMBODIMENT

Figure 1:
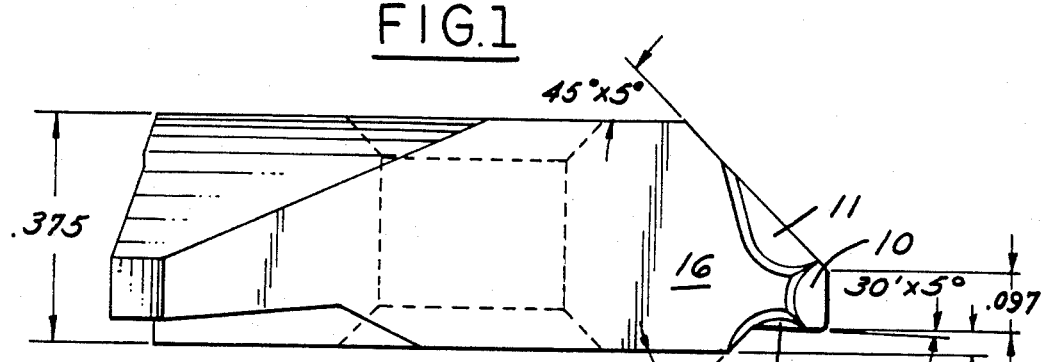
FIG. 1 is an enlarged plan elevation of a roughing/finishing threader insert constructed in accordance with the present invention.
Figure 2:
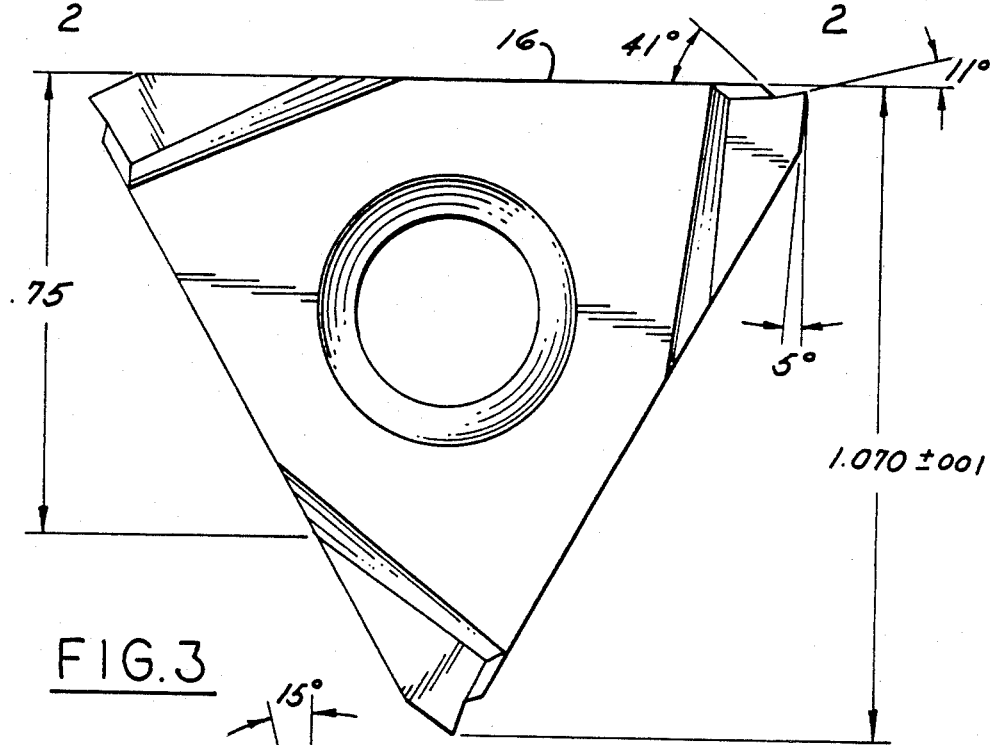
FIG. 2 is a side view taken along the line 2—2 of FIG. 1.
Figure 3:
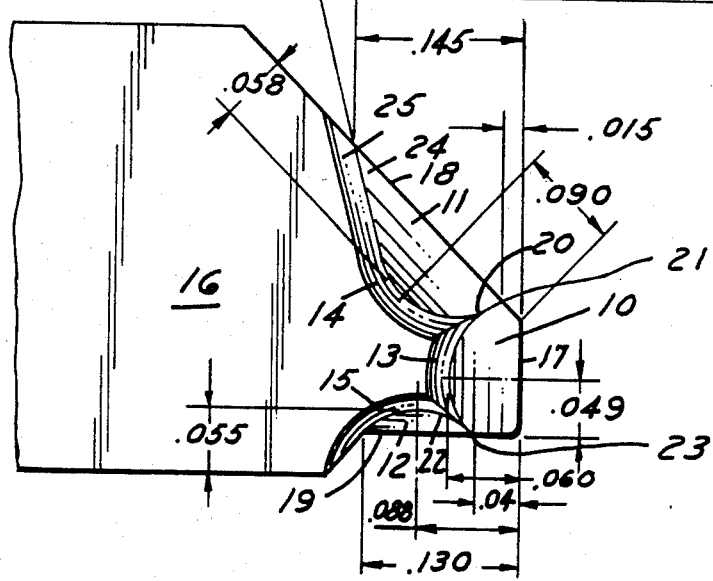
FIG. 3 is a further enlarged fragmentary view of a cutting corner of the insert illustrated in FIG. 1.

With reference to FIGS. 1–3, each cutting corner of the special roughing/finishing threader is provided with a nose scallop 10, major side scallop 11, and minor side scallop 12, each formed with an 11° positive flat surface relative to the plane of side wall 16 and to each cutting edge as seen in FIGS. 1 and 3. Chip breaking back walls 13, 14 and 15 extend from the inner edge of each scallop 10, 11 and 12, respectively at a 41° angle relative to the adjacent side wall 16. A 5° clearance angle is provided relative to each cutting edge 17, 18, and 19. Back wall 13 intersects back wall 14 in a diminishing ridge 20 which feathers out to a terminal end 21 substantially coincident with the cutting edge 18, and a similar ridge 22 at the intersection of back walls 13 and 15 feathers out to a terminal end 23 at the cutting edge 19.

Chip flow at the center scallop 10 is normal to the cutting edge 17 which is the direction of incremental tool feed for roughing/finishing an industry standard thread form appropriate for varying diameters which can remove approximately all or major portions of thread stock in fewer than previously required passes with excellent chip control.

Figure 4:
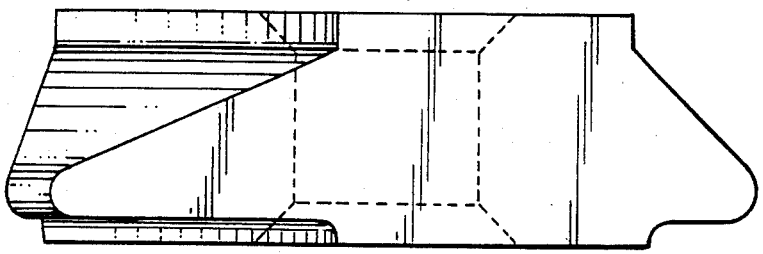
FIG. 4 is a plan elevation of a finish threader insert corresponding to the roughing/finishing insert of FIG. 1.
Figure 5:
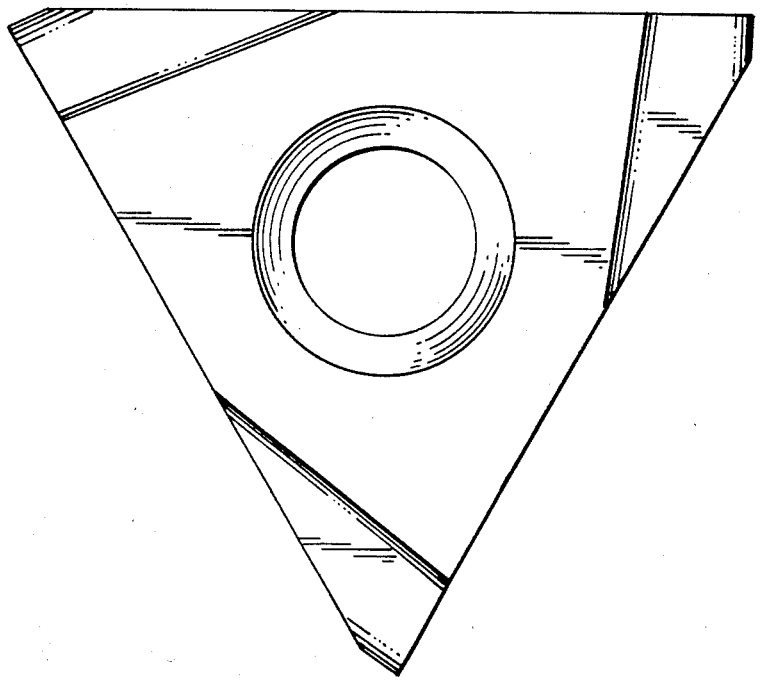
FIG. 5 is a side view taken along the line 5—5 of FIG. 4.

This compares with prior practice employing a roughing/finishing thread insert such as shown in FIGS. 4 and 5 for cutting the entire thread with some multiple passes involving string coils with no chip control and with production limited to approximately one thread per hour due not only to the large number of passes required but also the requirement for frequent interruption to remove the accumulated string coils.

The improvement of quadrupled production rates together with the convenience and safety improvement in the chip control roughing operation has resulted from this two stage roughing and finishing operation achieved with use of a rotating turret lathe head for mounting the respective roughing and finishing cutter inserts which are employed interchangeably for internal and mating external threads.

Detailed dimensions shown in FIGS. 1–3 which are illustrations in substantially enlarged scale, FIG. 3 being shown in double the enlargement of FIGS. 1 and 2, are typical for an industry standard 3 T. P. I. Buttress thread used for 12" to 26" diameter pipe, and it will be understood that proportional modifications may be adapted to different thread sizes and forms wherein the advantage of two stage roughing and finish threading may also be realized.

It should be particularly noted that chip control in roughing a Buttress form of thread is greatly improved by employing the linear extensions 24 and 25 of the respective scallop 11 flat and back wall 14 by feeding the master scallop grinder after axial plunge along the 15° path indicated, as compared to the result obtained by simple plunge grinding of the scallop with full arcuate back wall as in the case of scallops 10 and 12. A flat nose grinder with a 0.130" end diameter and 76° included conical angle form may be used for grinding the master for powdered metal tungsten carbide or comparable inserts provided with three indexable thread cutting corners as illustrated.

The specific dimensions of the disclosed embodiment may be substantially changed for other thread forms. In some cases the cutter may be used for roughing followed by a finishing form; in other cases, as in flat bottom or other thread forms, the cutter may be used for complete thread cutting.

The embodiment illustrated as a triangular insert may be modified to other indexable polygon shapes; or cutting corners may be provided at one or more ends of rectangular tooling.

We claim:

1. A roughing threader cutting tool with a body having opposed top and bottom surfaces joined by side wall surfaces intersecting to form plural cutting edges characterized by a central transverse thread cutting edge scallop nose, adjacent flank thread cutting edge side scallops, each scallop in plan view of the cutting edges having an arcuate chip breaking back wall including an arcuate base, each intersection of back walls between adjacent scallops forming a ridge of diminishing height continuing to and terminating substantially at a cutting edge.

2. The roughing threader cutting tool of claim 1 wherein each ridge terminates substantially at a flank cutting edge adjacent said transverse cutting edge.

3. The roughing threader cutting tool of claim 1 wherein each back wall extends from a planar scallop surface.

4. The roughing threader cutting tool of claim 1 wherein each back wall extends to a common planar cutter face.

5. The roughing threader cutting tool of claim 4 wherein said back walls extend at a angle in the order of 41° relative to said common face.

6. The roughing threader cutting tool of claim 3 wherein each planar scallop surface is formed with a positive rake.

7. The roughing threader cutting tool of claim 3 wherein each planar surface scallop is formed with a positive rake in the order of 11° relative to said common face extending perpendicular to its cutting edge.

8. The roughing threader cutting tool of claim 4 wherein a side wall for the cutting edge of each scallop is provided with a clearance angle of approximately 5° comprising an acute angle of approximately 85° relative to said common face.

9. The roughing theader cutting tool of claim 1 wherein each of said scallops is formed as a conical frustum segment.

10. The roughing threader cutting tool of claim 3 for a Buttress thread form having one approximately 45° flank, wherein a linear extension of the back wall for the scallop having a corresponding 45° cutting edge is provided at approximately a 30° angle to said cutting edge with a corresponding extension of the planar surface of said scallop.

11. The roughing threader cutting tool of claim 1 formed as a triangular insert having three indexable cutting corners.

12. The roughing threader cutting tool of claim 10 wherein the other thread flank cutting edge extends at an angle of approximately 30 minutes from a radial direction.

13. The roughing threader cutting tool of claim 9 wherein the planar surface of each scallop has its conical axis extending outside of the cutting edge.

14. The roughing threader cutting tool of claim 13 wherein each scallop is formed with 11° positive rake perpendicular to its side and a concave curved surface corresponding to a 0.130" minor diameter conical frustum with an approximately 75° included angle.

* * * * *